(12) United States Patent
Bharadwaj et al.

(10) Patent No.: US 12,045,531 B1
(45) Date of Patent: Jul. 23, 2024

(54) CONTEXT-BASED INFORMATION DISPLAYS

(71) Applicant: HITACHI, Ltd., Tokyo (JP)

(72) Inventors: Rahul Bharadwaj, Fremont, CA (US); Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/367,309

(22) Filed: Sep. 12, 2023

(51) Int. Cl.
| | |
|---|---|
| *G05B 23/02* | (2006.01) |
| *G06F 3/01* | (2006.01) |
| *G06F 3/14* | (2006.01) |
| *G06F 21/00* | (2013.01) |
| *G06K 7/10* | (2006.01) |
| *G06Q 10/0631* | (2023.01) |
| *G06V 40/10* | (2022.01) |
| *H04L 12/24* | (2006.01) |

(52) U.S. Cl.
CPC ............... *G06F 3/14* (2013.01); *G06F 3/011* (2013.01); *G06K 7/10297* (2013.01); *G06Q 10/063112* (2013.01); *G06V 40/10* (2022.01)

(58) Field of Classification Search
None
See application file for complete search history.

(56) References Cited

U.S. PATENT DOCUMENTS

| | | | |
|---|---|---|---|
| 7,868,778 B2 | 1/2011 | Kenwright | |
| 2018/0150071 A1* | 5/2018 | Ishihara | ............. G05B 23/0267 |
| 2020/0294377 A1* | 9/2020 | White | .................. G08B 13/248 |
| 2021/0011677 A1 | 1/2021 | Rao | |

FOREIGN PATENT DOCUMENTS

WO     2002071315 A2     9/2002

\* cited by examiner

*Primary Examiner* — Carl Adams
(74) *Attorney, Agent, or Firm* — Procopio, Cory, Hargreaves & Savitch LLP

(57) ABSTRACT

A method for generating and displaying context-based information. The method may include automatically identifying, by a processor, a person; identifying, by the processor, a display device closest in proximity to the person; generating, by the processor, context information specific to the person; and displaying the context information on the display device to be viewed by the person.

20 Claims, 16 Drawing Sheets

| Employee ID | Primary Location | Secondary Location | Tertiary Location | Active |
|---|---|---|---|---|
| 10984 | Machine A | Machine B | Machine C | True |
| 10876 | Machine B | Machine C | Machine A | True |
| 10915 | Desk A | Desk B | Desk C | False; Remote |

Add New Pathway

FIG. 10

CONTEXT-BASED INFORMATION DISPLAYS

BACKGROUND

Field

The present disclosure is generally directed to a method and a system for generating and displaying context-based information.

Related Art

In industrial settings such as a factory shop floor, a number of displays exist to provide results and constant notifications indicative of the state of the factory. Responses to these constant notifications are sometimes vital, and if missed, can have catastrophic repercussions. The information needing to be displayed has many conditions in a rapidly dynamic environment such as a factory shop floor. The information must be easy to interpret for an employee, have sufficient context for understanding, be displayed properly on the device, and have an instant response mechanism to allow for quick notification.

In the related art, a method for performing automatic positioning of display depending on viewer's location or gesture is disclosed. Image capturing devices are utilized to find a user's location and alter the physical specifications of a display through movements along the x, y and z axis to direct the display at the user. The user can also assign a specific gesture to set the display to a predetermined specification. If there are multiple users, the image capturing devices can converge on a median to where the display should be angled.

In the related art, a method for interacting with a proximity-responsive display is disclosed. Utilizing proximity sensors, predetermined audio-visual or multimedia responses are generated and provided when a user interacts with any portion of the display.

There are limitations to the information displayed and the form in which such information is displayed in each of the related arts mentioned above. In addition, information's formatting must be predetermined if there is to be any difference in formatting across different, displays. In some cases, the only part that is varied is the physical orientation of the display. Many different displays can exist in a factory/facility. For example, overhead television screens, laptop screens, small monitor displays, programmable logic controller (PLC) screens, etc. How the information is to be displayed must be predetermined before it can be displayed at a designated location.

In addition, minimal customization tools and automation are provided in the related art. Related arts fail to consider the relationship between an individual and multiple displays. If an individual/person moves around and changes locations continuously, the display where the information is to be shown should also be dynamically altered to allow the individual's access to information such that response time can be maintained. In addition, related arts provide minimal customization tools and automation in information and display generation.

With advances in computer vision and radio-frequency identification (RFID) technology, it has become possible to identify/locate a recipient employee and notify the employee of information in a prompt manner. However, the various displays in a factory/facility have different methods to display information which may include text, images, graphs, video, etc. In addition, the various displays may have different sizes and different orientations.

Thus, a need exists for a system where information context, interpretability, and proper display-design can be generated/populated automatically.

SUMMARY

Aspects of the present disclosure involve an innovative method for generating and displaying context-based information. The method may include automatically identifying, by a processor, a person; identifying, by the processor, a display device closest in proximity to the person; generating, by the processor, context information specific to the person; and displaying the context information on the display device to be viewed by the person.

Aspects of the present disclosure involve an innovative non-transitory computer readable medium, storing instructions for generating and displaying context-based information. The instructions may include automatically identifying a person; identifying a display device closest in proximity to the person; generating context information specific to the person; and displaying the context information on the display device to be viewed by the person.

Aspects of the present disclosure involve an innovative server system for generating and displaying context-based information. The system may include automatically identifying, by a processor, a person; identifying, by the processor, a display device closest in proximity to the person; generating, by the processor, context information specific to the person; and displaying the context information on the display device to be viewed by the person.

Aspects of the present disclosure involve an innovative system for generating and displaying context-based information. The system may include means for automatically identifying person; means for identifying a display device closest in proximity to the person; means for generating context information specific to the person; and means for displaying the context information on the display device to be viewed by the person.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 10 illustrates an example interface display 1000 of the employee pathway database 910, in accordance with an example implementation.

DETAILED DESCRIPTION

Figure 1:
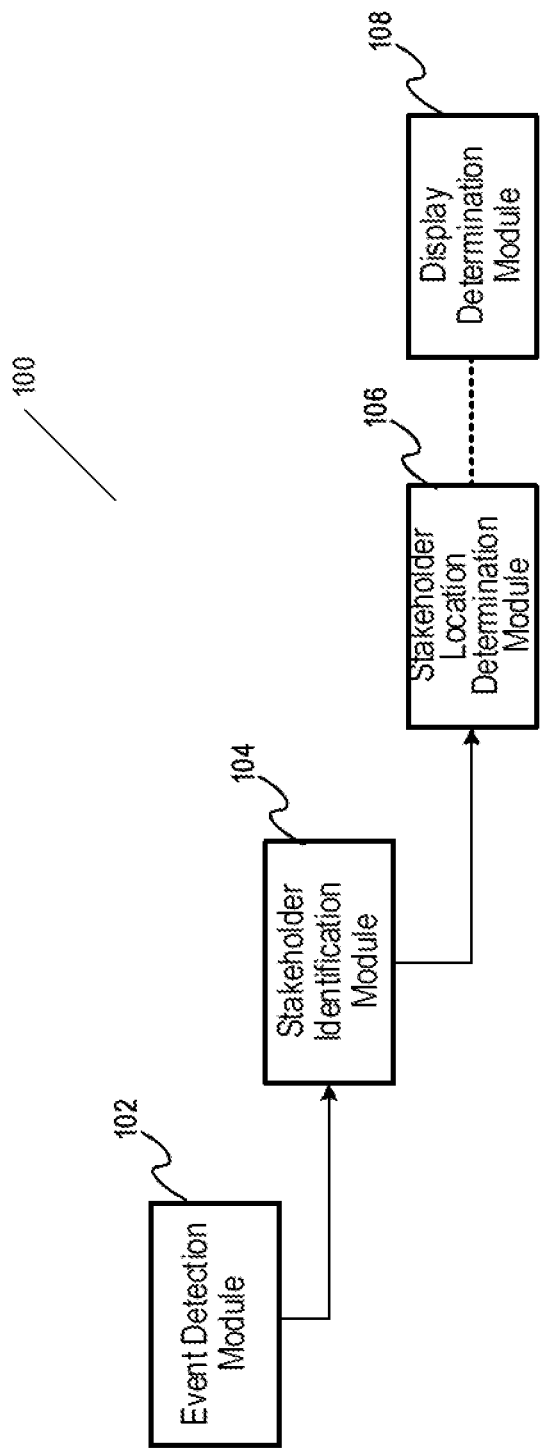
FIG. 1 illustrates an example system 100 for generating and displaying context-based information, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

A common problem within factories or work environments is response time. In work environments where employees are constantly moving, it is impossible to rapidly update them with information by means other than word of mouth. If an employee has a display asset, but is not attentive to the asset or otherwise nearby, there can be crucial time passing between when an update is sent to the asset and when the update is seen.

Example implementations described herein are directed to a method of notification display that displays notification/information to a specified individual or employee on a display nearby. This helps reduce the time it takes for an employee to be notified, and provides the employee with proper context and interpretability of the information to allow prompt action to be taken. Example implementations described herein can minimize the amount of time between occurrence of an event and a response to the event. For certain events, predetermined automatic responses can be written in to handle such events. For sensitive information, proper privacy methods for employee authorization can be written in. For immediate and informed responses, sufficient contextualization of information can be added in a readable, interpretable format.

Example implementations described herein can receive, summarize, and customarily split a large stream of information across multiple displays dynamically, depending on the context and content of the information, as well as the event that has taken place. Example implementations described herein are directed to a multi-faceted system that learns as more events transpire. For example, as more events take place, options to scribe these events and their associated protocols are stored into the system and learned. This decreases the amount of human interference required and the speed at which events are responded to. Example implementations also increase the interpretability and ease of access of information by dynamically updating displays with formatted information in a customizable fashion.

On a manufacturing shop floor, operational events occur continuously, which require the events to be detected and displayed/notified so that appropriate stakeholders can take actions to address the events. Such events may include occurrence of a defect in a part being produced, machine downtime, mechanical defect in a machine, shortage of labor or raw material, etc.

FIG. 1 illustrates an example system 100 for generating and displaying context-based information, in accordance with an example implementation. The system 100 may include components such as, but not limited to, an event detection module 102, a stakeholder identification module 104, a stakeholder location determination module 106, and a display determination module 108. The event detection module 102 helps gauge when an unexpected event has occurred and transmits a signal to the stakeholder identification module 104 notifying of the event occurrence.

The stakeholder identification module 104 is then triggered to process the event and identifies which individual(s) to be notified of the event. The stakeholder identification module 104 takes into consideration the authority of the individuals and their permission to be notified, as well as the techniques to employ in properly condensing the information for the information recipient. After an individual has been properly identified for notification, the location of the individual would need to be determined in real time, which is performed by the stakeholder location determination module 106. The stakeholder location determination module 106 is connected to the display determination module 108 in real time, where the display determination module 108 identifies a closest display device to the location of the individual.

Figure 2:
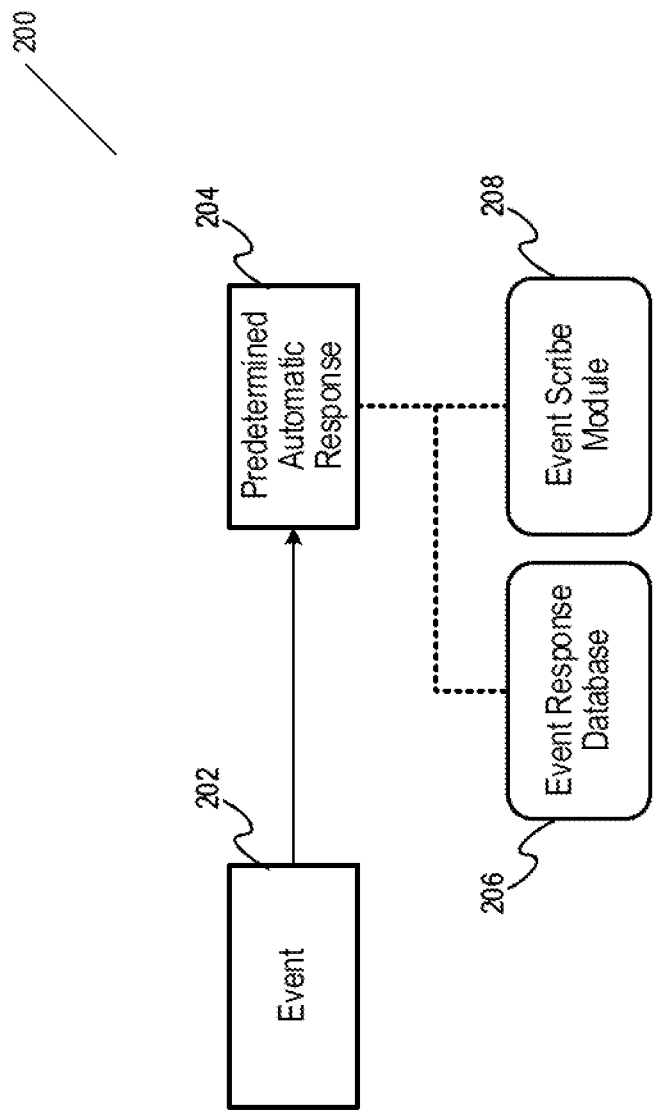
FIG. 2 illustrates an example diagram 200 for performing event detection and response generation on an event detection module 102, in accordance with an example implementation.

FIG. 2 illustrates an example diagram 200 for performing event detection and response generation on an event detection module 102, in accordance with an example implementation. As illustrated in FIG. 2, after an event 202 has occurred and been detected, the event 202 is analyzed by the event detection module 102 to determine a predetermined automatic response 204 to the event 202. An event response database 206 is used in determining the predetermined automatic response 204. The event response database 206 contains a collection of identified events and associated automatic responses (actions/protocols). If the detected event 202 corresponds to an identified event contained in the event response database 206 and a corresponding automatic response is present, then the automatic response is employed as the predetermined automatic response 204 for addressing the event 202.

If the detected event 202 does not correspond to any event contained in the event response database 206, then an event scribe module 208 may be used in adding the event 202 and a corresponding automatic response to the event response database 206. Similarly, if the detected 202 corresponds to an identified event contained in the event response database 206 that does not have a corresponding automatic response, then the event scribe module 208 may be utilized in adding the event 202 and a corresponding automatic response to the event response database 206.

Figure 3:
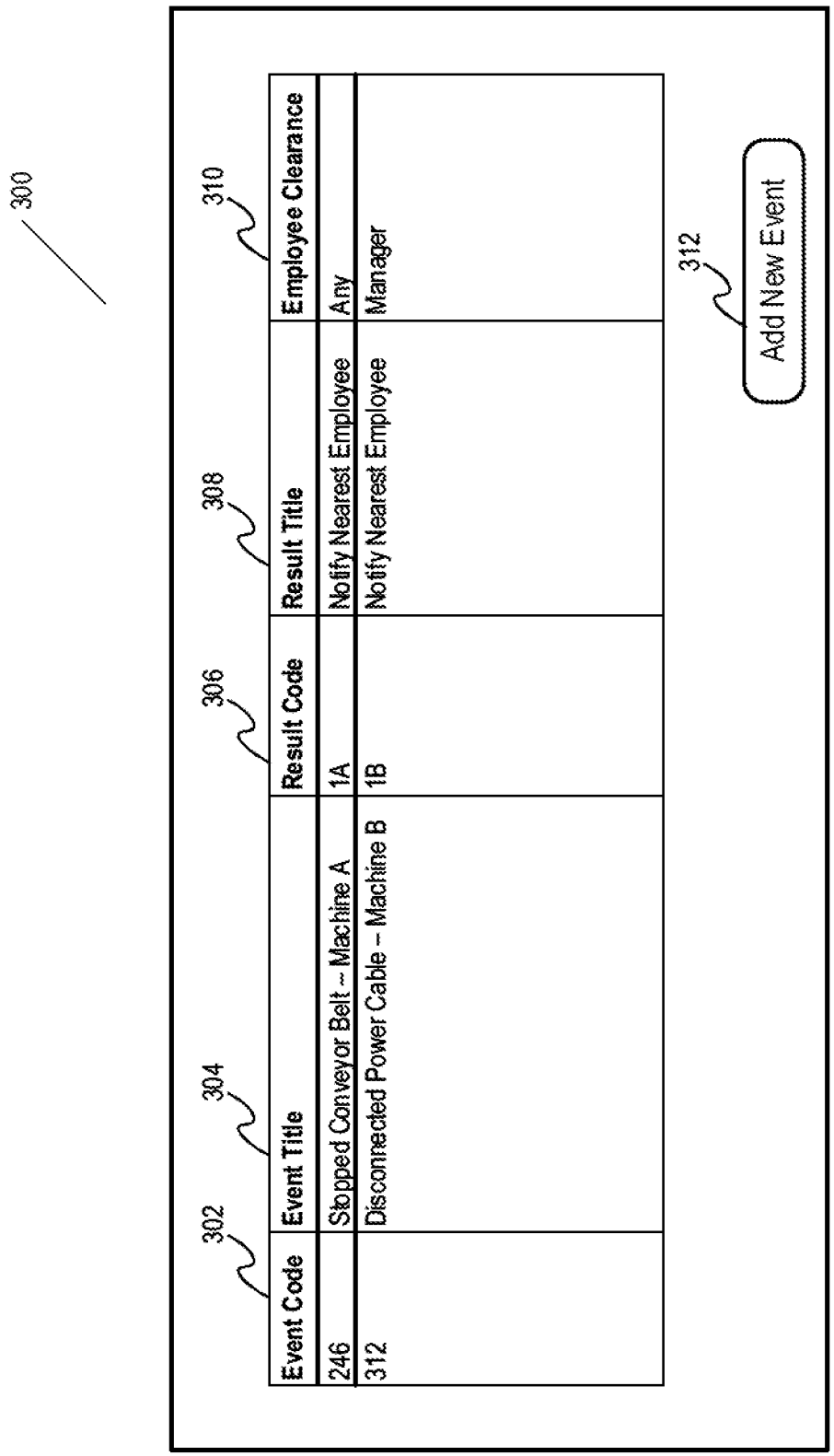
FIG. 3 illustrates an example interface 300 of the event response database 206, in accordance with an example implementation.

FIG. 3 illustrates an example interface 300 of the event response database 206, in accordance with an example implementation. As illustrated in FIG. 3, the interface 300 may display information such as, but not limited to, event code 302, event title 304, result code 306, result title 308, and employee clearance 310. Two event entries are shown in FIG. 3, with the first event having the event code "246" and the second event having the event code "312". Event code 302 is the event identifier associated with an event and event title 304 provides title and additional information associated with the identified event. For example, for event code "246", the associated event title shows that conveyor belt has stopped and is associated with Machine A.

Result code 306 is the action identifier of a predetermined action/protocol associated with an event. For example, the result code "1A" is the action identifier of a predetermined action associated with event having event code "246". Result title 308 action information associated with the identified result code. Employee clearance 310 provides information on clearance required to access the details/information. If a predetermined action/protocol cannot be located for an event, then the user has the option of creating an action for the event. As illustrated in FIG. 3, an add new event button 312 can be selected when no predetermined action/protocol can be located for an event. On clicking the add new event button 312, the user has the option to select an action to be taken, as well as setting the corresponding employee clearance level.

Figure 4:
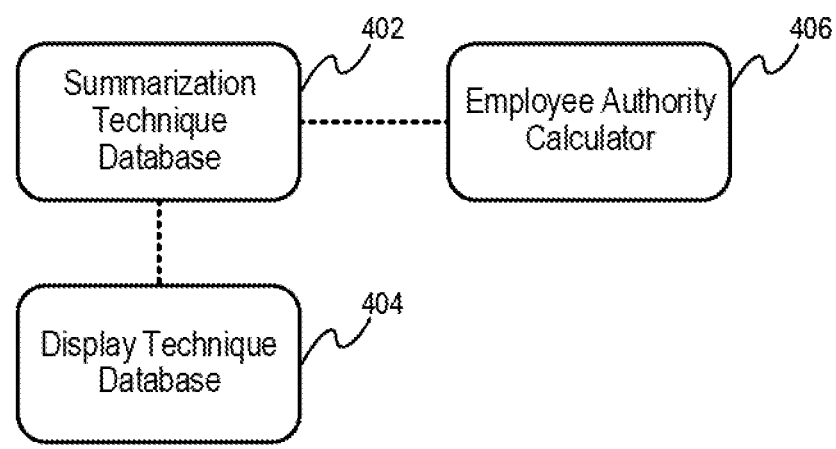
FIG. 4 illustrates an example configuration of the stakeholder identification module 104, in accordance with an example implementation.

FIG. 4 illustrates an example configuration of the stakeholder identification module 104, in accordance with an example implementation. In order for information to be properly displayed, display fitting and employee authorization must be taken into account in generating such information. The stakeholder identification module 104 provides and utilizes various techniques in determining information to be displayed and may include components such as, but not limited to, a summarization technique database 402, a display technique database 404, an employee authority calculator 406, etc.

The stakeholder identification module 104 analyses information associated with an event (event 202) to determine a summarization technique to be applied to the information. The summarization technique database 402 stores summarization techniques to be applied on event information received. Event 202 may include event information in at least one of two forms, visual information/aid and textual information. Visual information/aid may include information such as, but not limited to, graphs, tables, charts, diagrams, etc. If visual information/aid is present, a determination is made as to whether it would be feasible to display the information in full. If complete display of the visual information/aid is not feasible, then a summarization technique is retrieved from the summarization technique database 402 to convert/summarize the visual information/aid into a readable format (e.g., scrubbing, etc.). If textual information is present, a summarization technique may be retrieved to paraphrase the texts into a format that is custom to the device that the information will be sent to.

Different types of display devices may exist on a factory floor, and each has its own specifications. One of the most critical specifications used in information display generation is display size. A display device with a large display area is able to display more information when compared to a display device with a small display area. While different displays may utilize the same paraphrasing/summarization technique from the summarization technique database 402, the visual display in which this information is displayed may differ across the different displays. The display technique database 404 analyses information associated the event 202 to determine a display technique to be utilized on the information. Various formatting techniques are contained in the display technique database 404 and are associated with the different summarization techniques found in the summarization technique database 402. The visual and textual information of the event 202 serve as inputs to the display technique database 404 in identifying or generating a display technique.

The employee authority calculator 406 performs the calculation of employee authority through received employee information (e.g., title, rank, job function, availability, etc.). In some example implementations, the employee authority calculator 406 further categorizes employees into various categories based on calculated authority (e.g., manager/managerial, executive, etc.).

Figure 5:
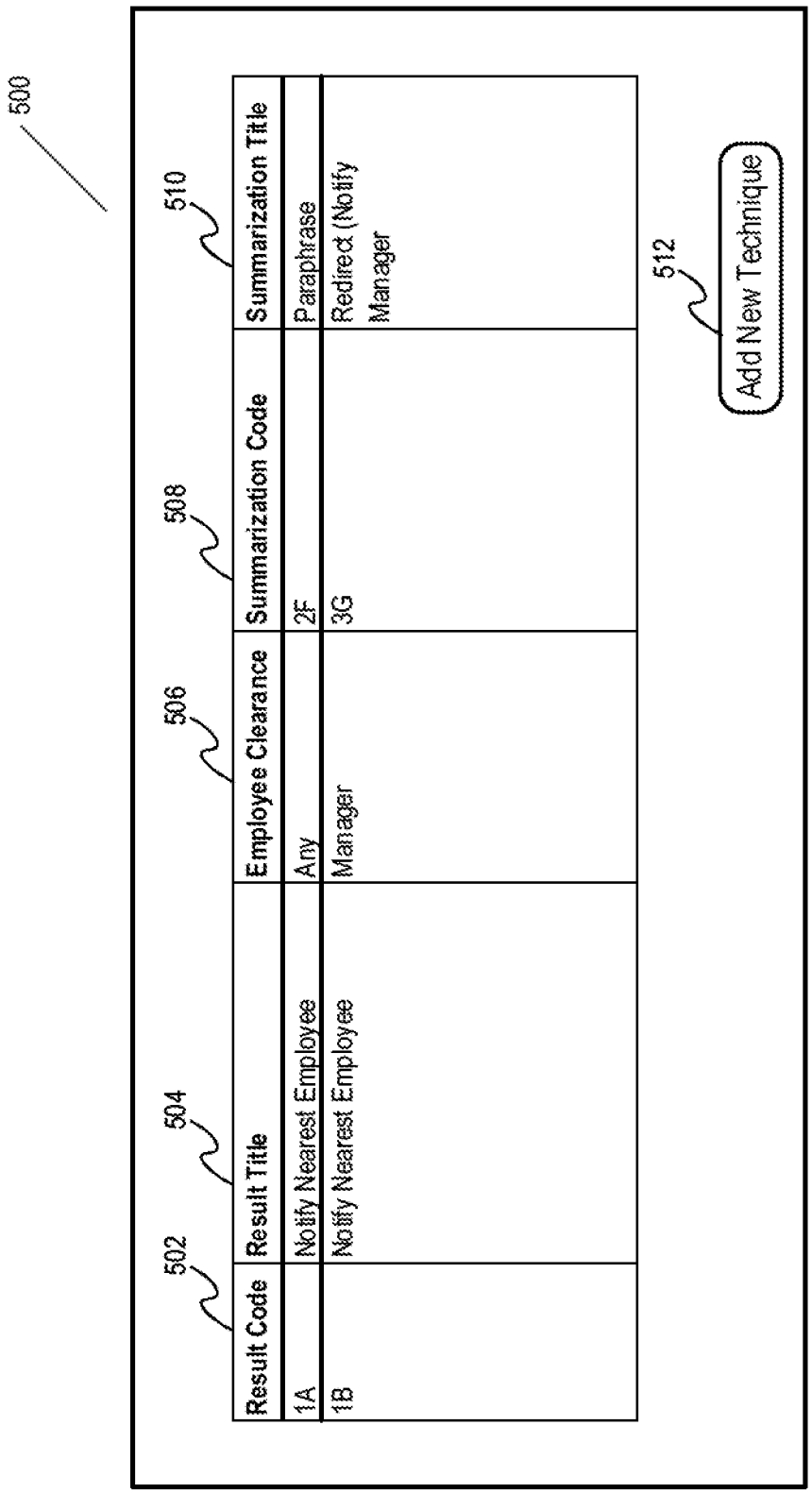
FIG. 5 illustrates an example interface 500 of the summarization technique database 402, in accordance with an example implementation.

FIG. 5 illustrates an example interface 500 of the summarization technique database 402, in accordance with an example implementation. As illustrated in FIG. 5, the interface 500 may display information such as, but not limited to, result code 502, result title 504, employee clearance 506, summarization code 508, and summarization title 510. The result code 502, the result title 504, and the employee clearance 506 correspond to the result code 306, the result title 308, and the employee clearance 310 of FIG. 3. The column of summarization code 508 corresponds to identifiers of the various summarization techniques. Summarization title 510 indicates the predetermined default summarization technique associated with summarization code 508. As illustrated in FIG. 5, an add new technique button 512 can be selected when no predetermined/default summarization technique can be located. On clicking the add technique button 512, the user has the option to select a summarization technique to be applied and stored as a new default. In some example implementations, the user can create a new summarization technique by choosing the type of information to display and how to display such information on the interface 500.

Figure 6:
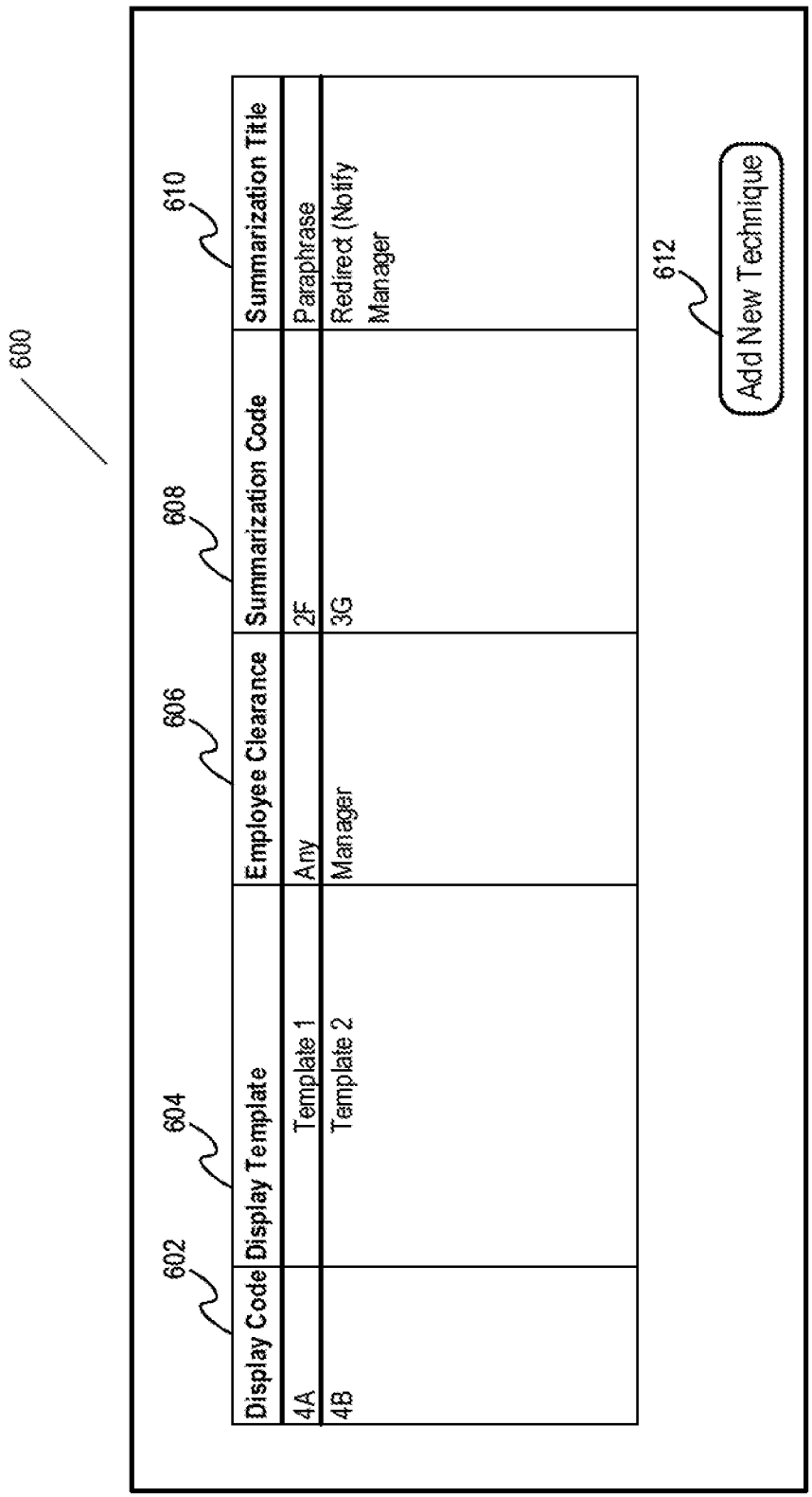
FIG. 6 illustrates an example interface 600 of the display technique database 404, in accordance with an example implementation.

FIG. 6 illustrates an example interface 600 of the display technique database 404, in accordance with an example implementation. As illustrated in FIG. 6, the interface 600 may display information such as, but not limited to, display code 602, display template 604, employee clearance 606, summarization code 608, and summarization title 610. The employee clearance 606, the summarization code 608, and the summarization title 610 corresponds to the employee clearance 506, the summarization code 508, and the summarization title 510 of FIG. 5. The display code 602 corresponds to identifiers of the various display devices. For example, 4A may represent a personal monitor display, while 4B may represent a tablet. Display template 604 indicates the display template to be used for each summarization technique and employee clearance combination. As illustrated in FIG. 6, an add new technique button 612 can be selected when no predetermined/default display technique can be located. On clicking the add technique button 612, the user has the option to select a display technique to be applied and stored as a new default. In some example implementations, the user can create a new summarization technique by choosing the type of information to display and how to display such information on the interface 600.

Figure 7:
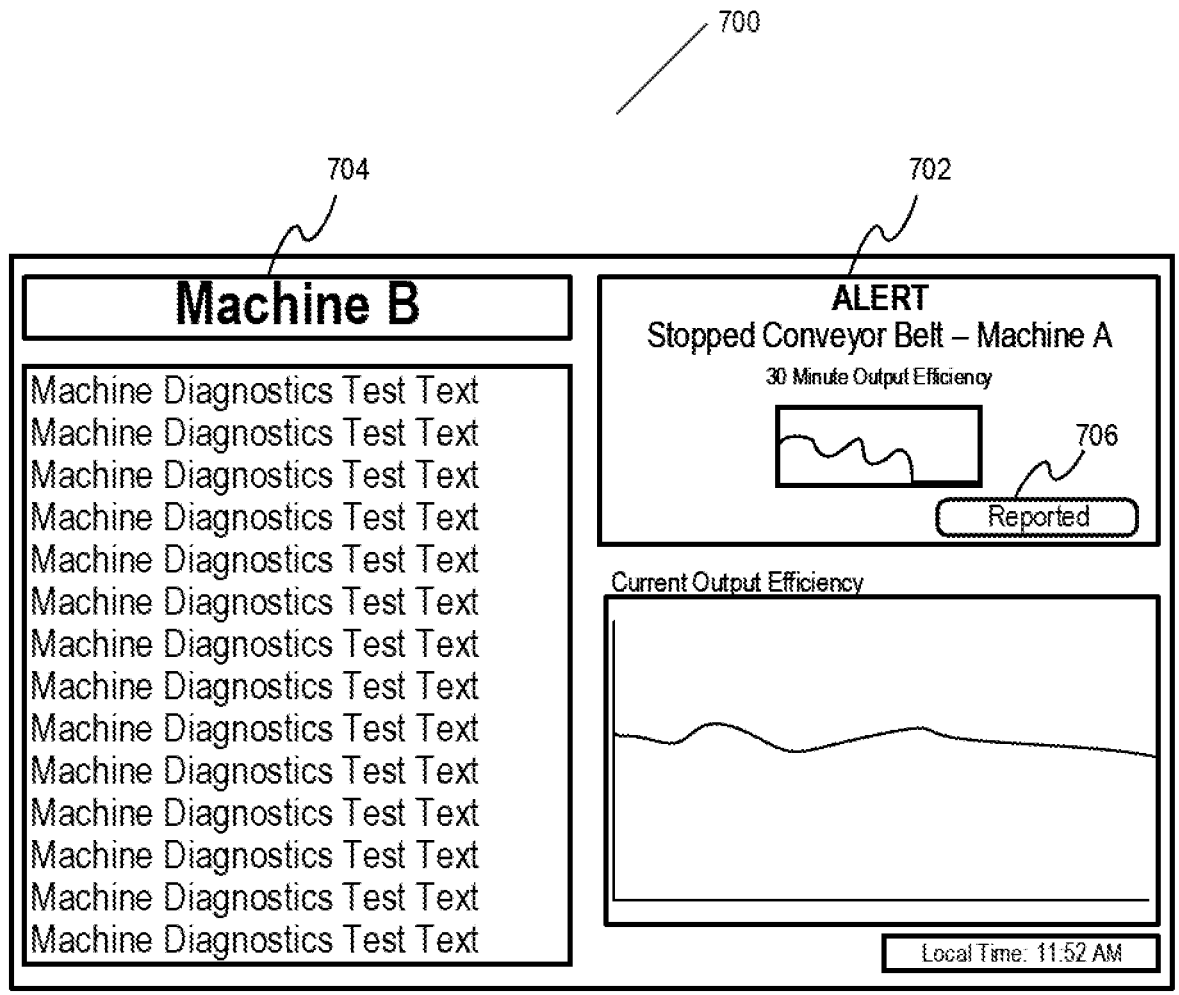
FIG. 7 illustrates an example display technique template 700, in accordance with an example implementation.

FIG. 7 illustrates an example display technique template 700, in accordance with an example implementation. The display technique template 700 corresponds to "template 1" shown in FIG. 6 and is applied to a personal display device such as a computer monitor. The notification displayed from an event is represented by notification display 702, while the rest of the screen, display area 704, displays information pertinent to an employee's work or operations associated with the factory floor/facility. A reporting button 706 is provided as a part of the notification display 702 for the employee/notice recipient to select when the event has been successfully handled.

Graphical display of information is made possible given the size of the display device. For example, a graphic display of Machine A's efficiency is shown in the notification display 702 of FIG. 7. Referring back to FIG. 6, employee clearance 606 indicates that employee authorization for this information is "Any", which means that there is no need to cover sensitive information, and the information (e.g., event title 304) of the event can be displayed on the notification.

Figure 8:
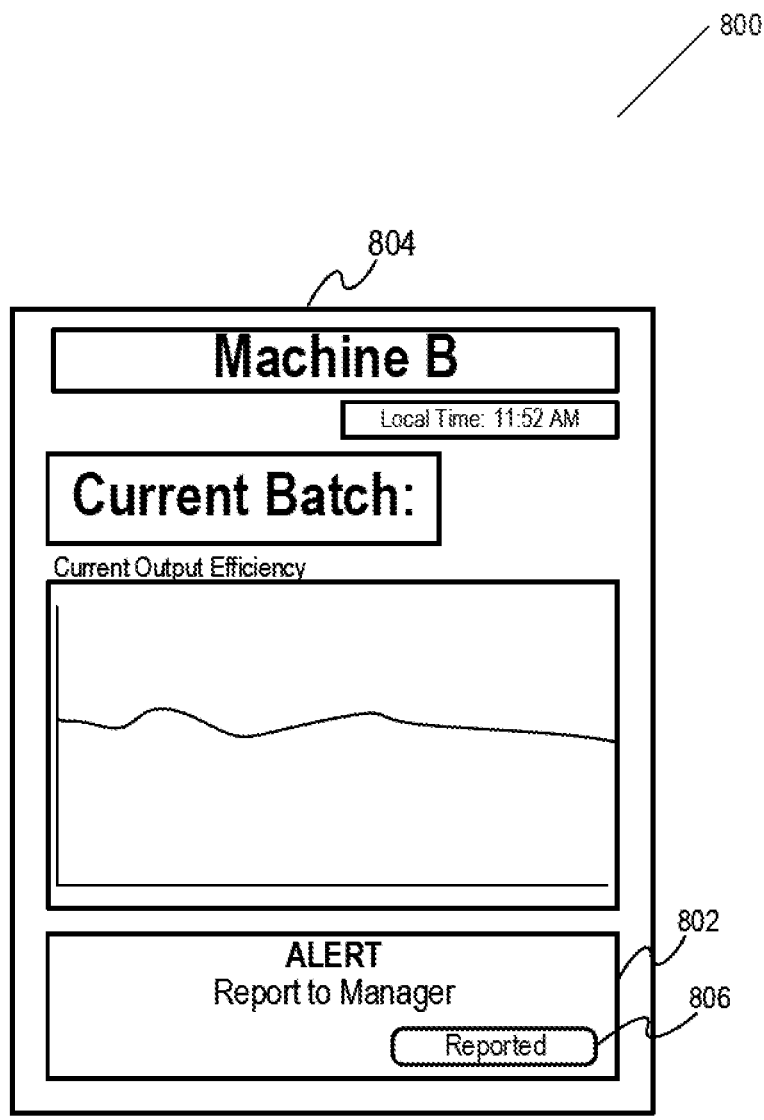
FIG. 8 illustrates an example display technique template 800, in accordance with an example implementation.

FIG. 8 illustrates an example display technique template 800, in accordance with an example implementation. The display technique template 800 corresponds to "template 2" shown in FIG. 6 and is applied to a mobile display device such as a tablet. The notification displayed from an event is represented by notification display 802, while the rest of the screen, display area 804, displays information pertinent to an employee's work or operations associated with the factory floor/facility. A reporting button 806 is provided as a part of the notification display 802 for the employee/notice recipient to select when the event has been successfully handled.

Information display may be limited given the size of the display area, which may involve reduction in display of textual and/or graphical information. Referring back to FIG. 6, employee clearance 606 indicates that employee authorization for this information is "Manager", which means that there is a need to cover sensitive information, and the information (e.g., event title 304) of the event is not shown in the notification display 802. An employee using the tablet can notify a manager and the manager can access this information at an external source to handle the event.

Figure 9C:
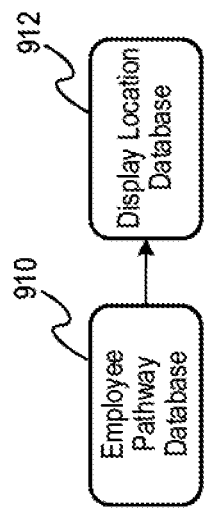
FIGS. 9(A)-(D) illustrate example methods for performing employee identification and display identification using the stakeholder location determination module 106 and the display determination module 108, in accordance with an example implementation.
Figure 9D:
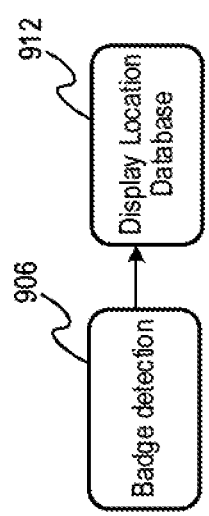
Figure 9A:
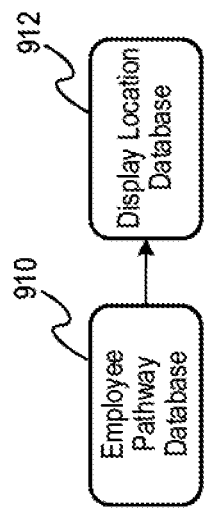

FIGS. 9(A)-(D) illustrate example methods for performing employee identification and display identification using the stakeholder location determination module 106 and the display determination module 108, in accordance with an example implementation. FIG. 9(A) illustrates a first method that utilizes human recognition 902 for performing stakeholder detection and object recognition 904 for finding a display device closest to the detected stakeholder. The stakeholder location determination module 106 utilizes computer vision algorithms for performing human recognition 902 to locate/detect the stakeholder. In some example implementations, the human recognition 902 is performed using a facial recognition algorithm. In some example implementations, privacy-maintained human detection algorithm may be used in place of facial recognition algorithm to protect employee privacy. The display determination module 108 then utilizes object recognition 904 to find/locate the closest display device to the stakeholder.

Figure 12:
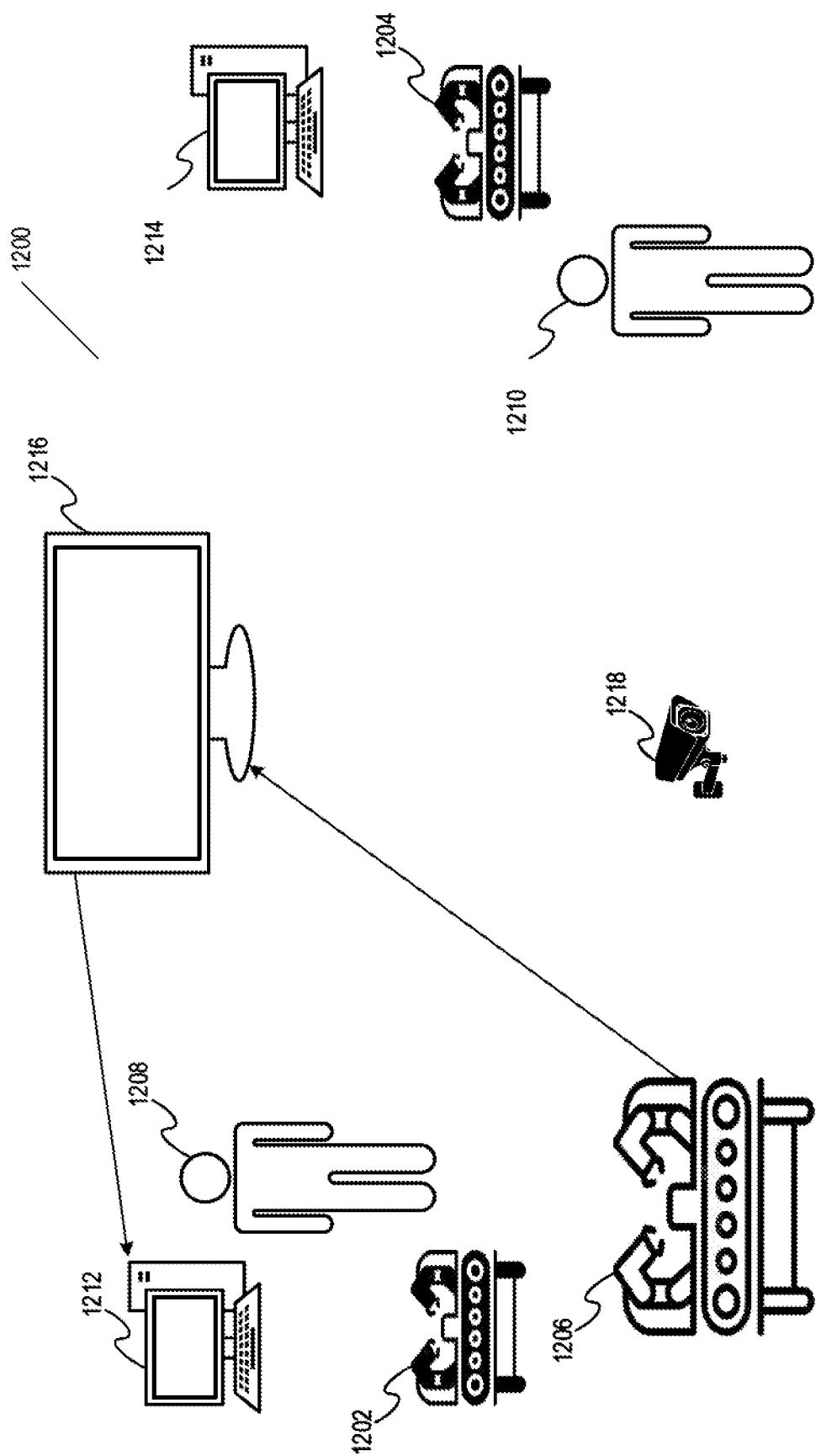
FIG. 12 illustrates an example scenario 1200 using the method shown in FIG. 9(A), in accordance with an example implementation.

FIG. 12 illustrates an example scenario 1200 using the method shown in FIG. 9(A), in accordance with an example implementation. A number of machines, such as machines 1202, 1204, and 1206, are operating in a factory room with a number of employees (e.g., employees 1208 and 1210) monitoring and maintaining the machines. Employees 1208 and 1210 can view machine diagnostics and relevant notifications on display devices 1212 and 1214, assuming that machine 1206 malfunctioned and a warning notification is sent to a central display 1216 for employees 1208 and 1210 to review and address. If the warning notification is not reviewed and cleared (e.g., through checking of a completion button displayed on the central display 1216) within a predetermined time period, then human recognition 902 is performed using sensing device 1218 to identify an employee that is currently in the factory room; for example, employee 1208. Then object recognition 904 is performed using sensing device 1218 to identify the closest display device to the employee 1208, in this case, display device 1212. A summarized notification is then issued to the display device 1212 for the employee 1208 to review.

Figure 9B:
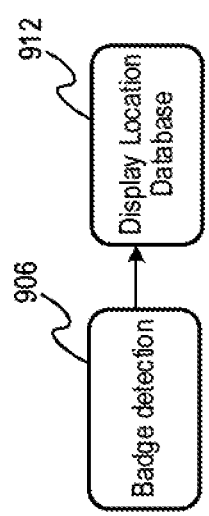

Referring back to FIG. 9. FIG. 9(B) illustrates a second method that utilizes badge detection 906 for locating stakeholders. The stakeholder location determination module 106 utilizes radio-frequency identification (RFID) locators for locating/detecting stakeholders within work site. The RFID locators perform badge detection 906 on stakeholder RFIDs to locate the closest stakeholders. In some example implementations, RFIDs are tagged (e.g., using RFID tags or tokens, etc.) to the various display devices and tag detection 908 is performed by the display determination module 108 to locate the closest display device to the identified stakeholder.

FIG. 9(C) illustrates a third method that utilizes a pathway algorithm for locating stakeholders/employees. The pathway algorithm utilizes an employee pathway database 910 for locating stakeholders/employees. The employee pathway database 910 may include information on primary, secondary, and tertiary working locations of the employees and their activity on any given day. In some example implementations, when used in conjunction with a display location database 912, a summarized notification can be issued and displayed on all three display devices associated with primary, secondary, and tertiary working locations of an identified employee. The display location database 912 may include information identifying display devices and their associated locations. For example, the closest display device can be located by comparing distances of a number of display devices to the primary working location of a stakeholder/employee. The employee pathway database 910 and the display location database 912 are described in more detail below.

FIG. 9(D) illustrates a fourth method that utilizes both badge detection 906 and pathway algorithm. The stakeholder location determination module 106 utilizes radio-frequency identification (RFID) locators for locating/detecting stakeholders that are within vicinity of an event. When used in conjunction with a display location database 912, a summarized notification can be issued and displayed on a display device located at the primary working location. In some example implementations, the RFID locators are used to determine on site presence of a stakeholder.

FIG. 10 illustrates an example interface display 1000 of the employee pathway database 910, in accordance with an example implementation. As illustrated in FIG. 10, the interface display 1000 may display information such as, but not limited to, employee ID 1002, primary location 1004, secondary location 1006, tertiary location 1008, and active status 1010. The employee ID 1002 contains unique identification numbers that represent the various employees/stakeholders. Primary location 1004 corresponds to the primary work location that an employee/stakeholder is associated with. Secondary location 1006 corresponds to the secondary work location that an employee/stakeholder is associated with. Tertiary location 1008 corresponds to the tertiary work location that an employee/stakeholder is associated with. Active status 1010 corresponds to an employee/stakeholder's work status on any given day, and may include status confirmation (e.g., true, false, etc.) and work arrangement (e.g., on site, remote, hybrid, etc.). A new employee pathway can also be generated by selecting the add new pathway button 1012.

Figure 11:
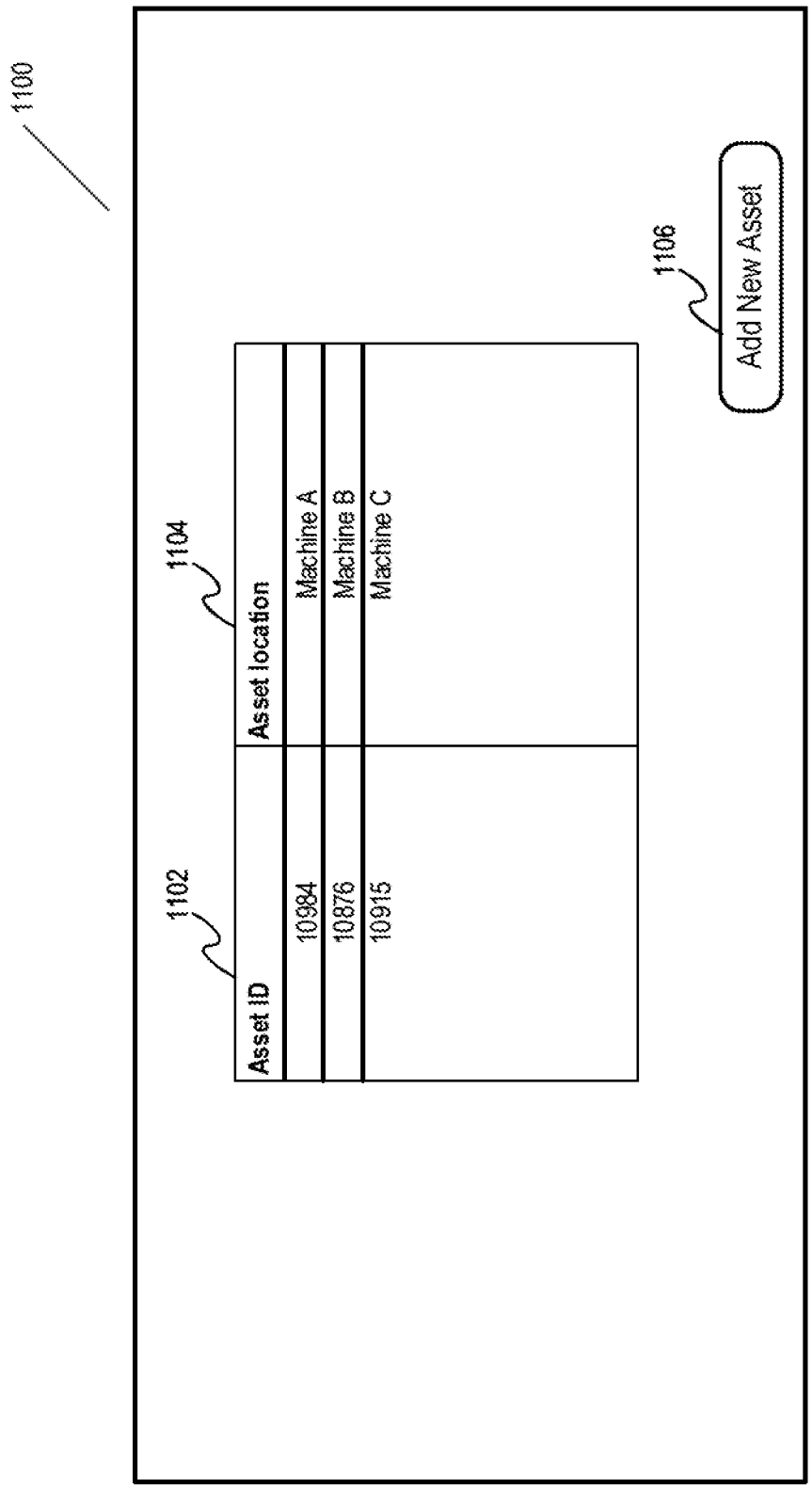
FIG. 11 illustrates an example interface display 1100 of the display location database 912, in accordance with an example implementation.

FIG. 11 illustrates an example interface display 1100 of the display location database 912, in accordance with an example implementation. As illustrated in FIG. 11, the interface display 1100 may display information such as, but not limited to, asset ID 1102 and asset location 1104. The asset ID 1102 contains unique identification numbers that represent the various display devices/assets. Asset location 1104 corresponds to the location of the asset. A new asset can also be generated by selecting the add new asset button 1106.

Figure 13:
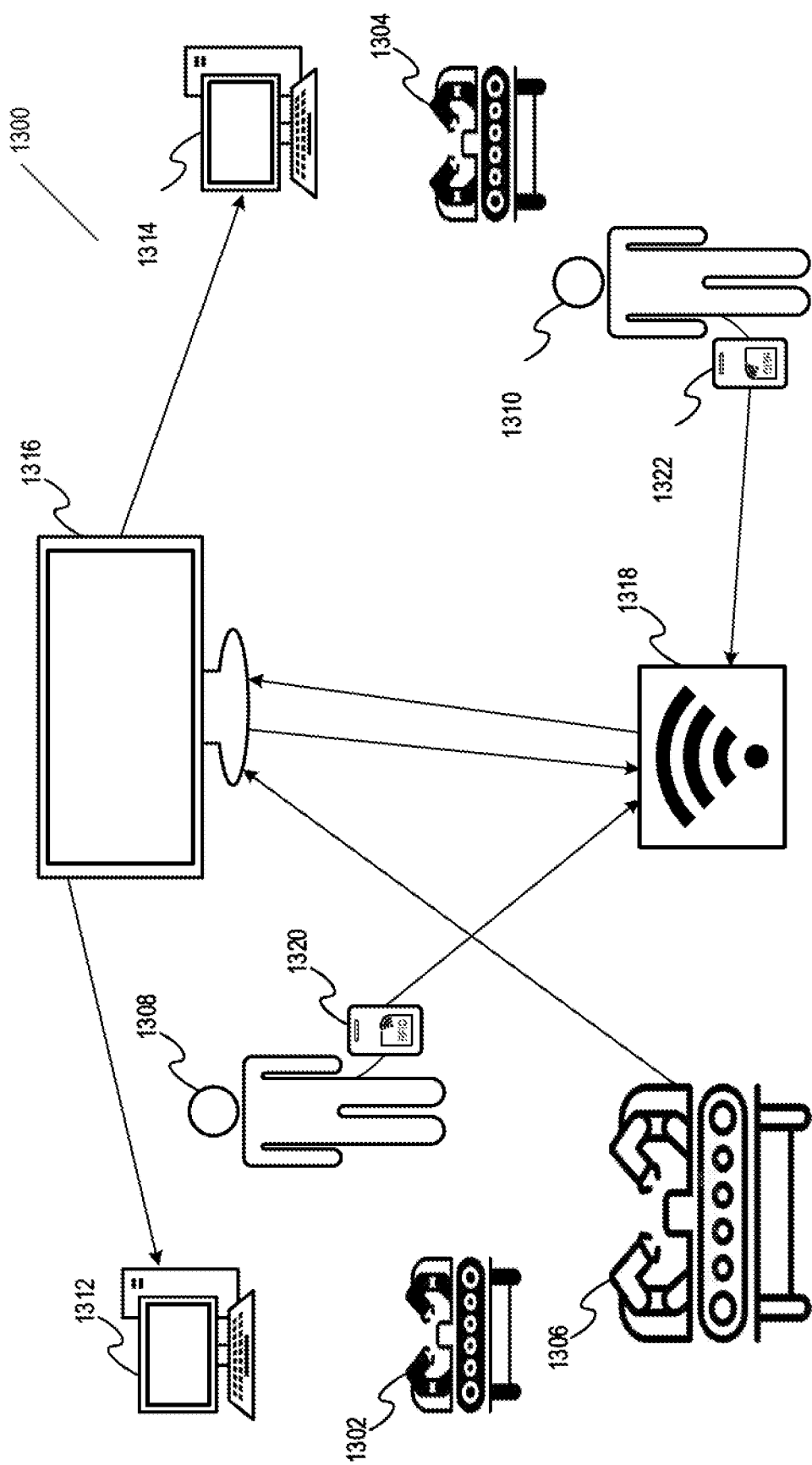
FIG. 13 illustrates an example scenario 1300, in accordance with an example implementation.

FIG. 13 illustrates an example scenario 1300, in accordance with an example implementation. A number of machines, such as machines 1302, 1304, and 1306, are operating in a factory room with a number of employees (e.g., employees 1308 and 1310) monitoring and maintaining the machines. Employees 1308 and 1310 can view machine diagnostics and relevant notifications on display devices 1312 and 1314, assuming that machine 1306 malfunctioned and a warning notification is sent to a central display 1316 for employees 1308 and 1310 to review and address. If the warning notification is not reviewed and cleared (e.g., through checking of a completion button displayed on the central display 1316) within a predetermined time period, then badge detection 906 is performed through an antenna 1318 to search for nearby RFID badges (e.g., badges 1320 and 1322). Badge 1320 is associated with employee 1308, while badge 1322 is associated with employee 1310. Once an employee is determined as being nearby, for example employee 1308, then the employee pathway database 910 is referenced to identify the primary work location of employee 1308. Display location database 912 is then utilized to identify a display device closest to employee 1308's primary work location; for example, display device 1312. A summarized notification is then issued to the display device 1312 for the employee 1308 to review.

Figure 14:
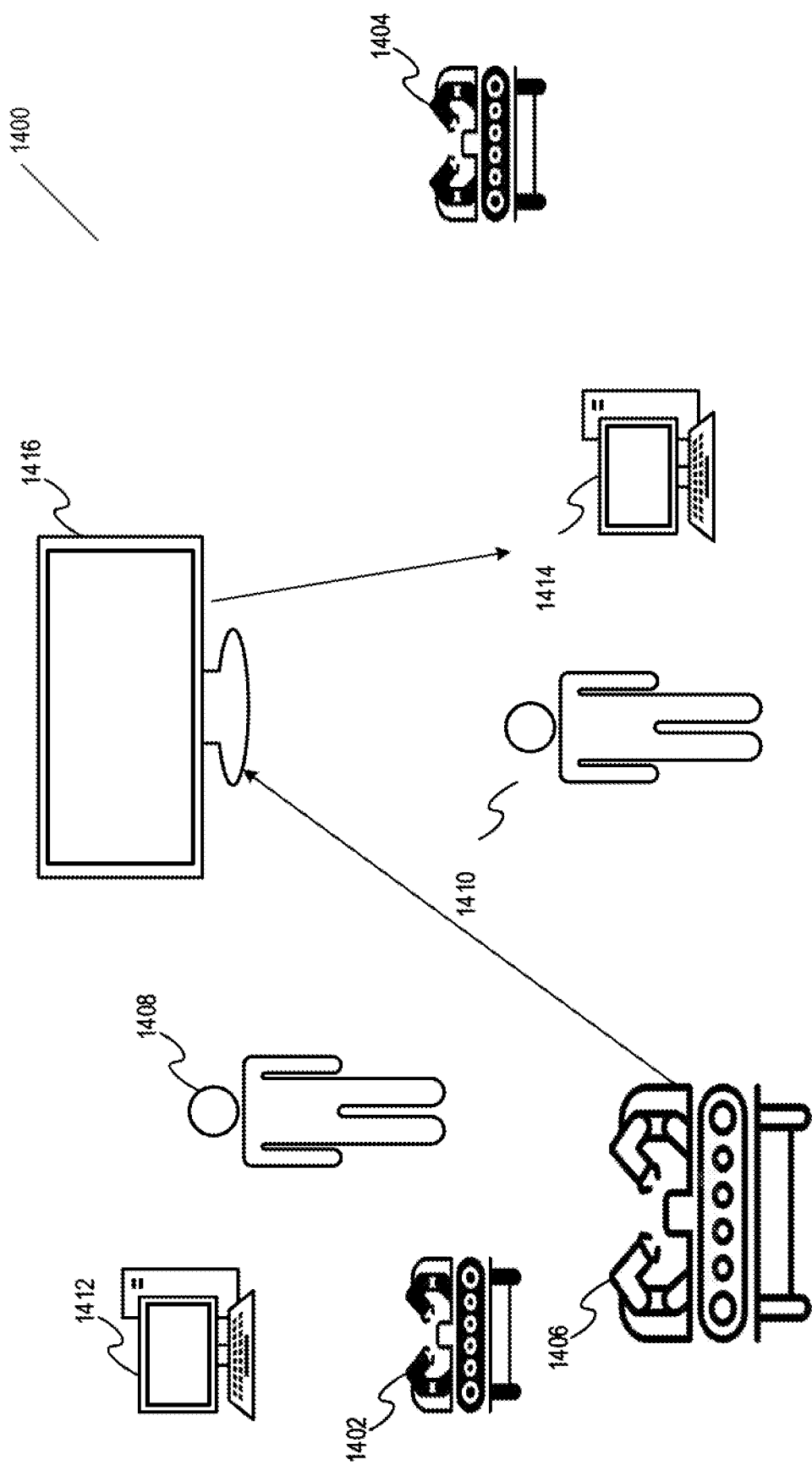
FIG. 14 illustrates an example scenario 1400, in accordance with an example implementation.

FIG. 14 illustrates an example scenario 1400, in accordance with an example implementation. A number of machines, such as machines 1402, 1404, and 1406, are operating in a factory room with a number of employees (e.g., employees 1408 and 1410) monitoring and maintaining the machines. Employees 1408 and 1410 can view machine diagnostics and relevant notifications on display devices 1412 and 1414. Assuming that machine 1406 malfunctioned and a warning notification is sent to a central display 1416 for employees 1408 and 1410 to review and address. If the warning notification is not reviewed and cleared (e.g., through checking of a completion button displayed on the central display 1416) within a predetermined time period, then the employee pathway database 910 is referenced/consulted to identify an active employee closest to the machine 1406; for example, employee 1410. Display location database 912 is then utilized to identify a display device closest to the machine 1406; for example, display device 1414. A summarized notification is then issued to the display device 1414 for the employee 1410 to review. If the summarized notification is not cleared or reviewed within a predetermined time period, then employee identification is reperformed using the employee pathway database 910 to find another active employee.

In some example implementations, if both employees 1408 and 1410 are located by consulting the employee pathway database 910 and determined as available, then the summarized notification is sent to some or all display devices that are associated with the working locations of the employees.

Figure 15:
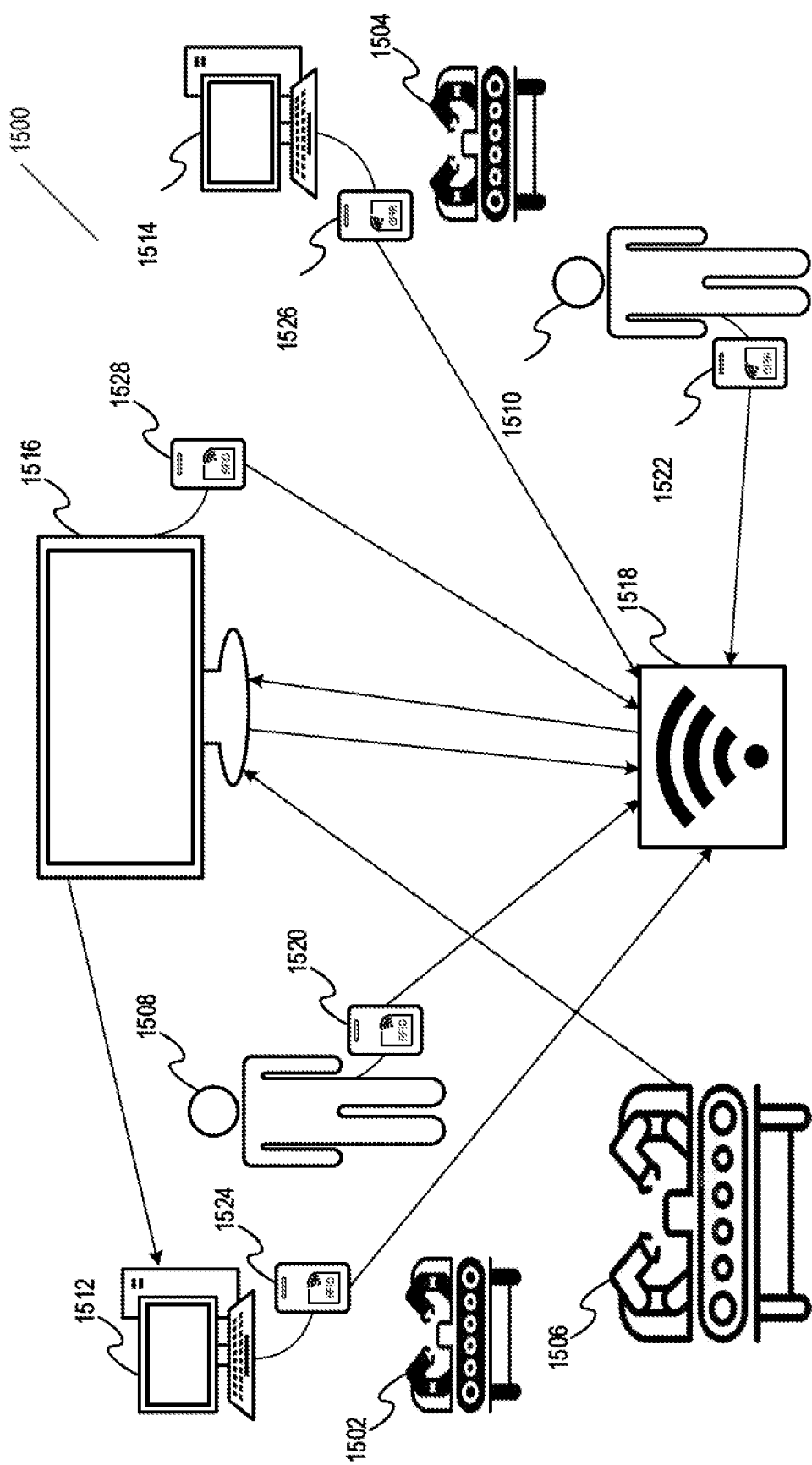
FIG. 15 illustrates an example scenario 1500, in accordance with an example implementation.

FIG. 15 illustrates an example scenario 1500, in accordance with an example implementation. A number of machines, such as machines 1502, 1504, and 1506, are operating in a factory room with a number of employees (e.g., employees 1508 and 1510) monitoring and maintaining the machines. Employees 1508 and 1510 can view machine diagnostics and relevant notifications on display devices 1512 and 1514. Assuming that machine 1506 malfunctioned and a warning notification is sent to a central display 1516 for employees 1508 and 1510 to review and address. If the warning notification is not reviewed and cleared (e.g., through checking of a completion button displayed on the central display 1516) within a predetermined time period, then badge detection 906 and tag detection 908 are performed through an antenna 1518 to search for nearby RFID badges (e.g., badges 1520 and 1522) and RFID tags (e.g., tag 1524 and tag 1526). Badge 1520 is associated with employee 1508, while badge 1522 is associated with employee 1510. Tag 1524 is associated with display device 1512, and tag 1526 is associated with display device 1514. Once an employee is determined as being nearby, for example employee 1508, then the antenna 1518 searches for a device tag that is nearby employee 1508; for example, tag 1524. A summarized notification is then issued to the display device 1512 for the employee 1508 to review. In some example implementations, the central display 1516 may be associated with a tag 1528, which can be used for tag detection 908 for central display selection.

The foregoing example implementation may have various benefits and advantages. For example, allowing a user to add authority and priority elements to the notification while maintaining the severity and urgency of the notification. Additionally, infrastructure is provided to follow proper predetermined protocol in all facets of contextualization, summarization, and interpretability.

Figure 16:
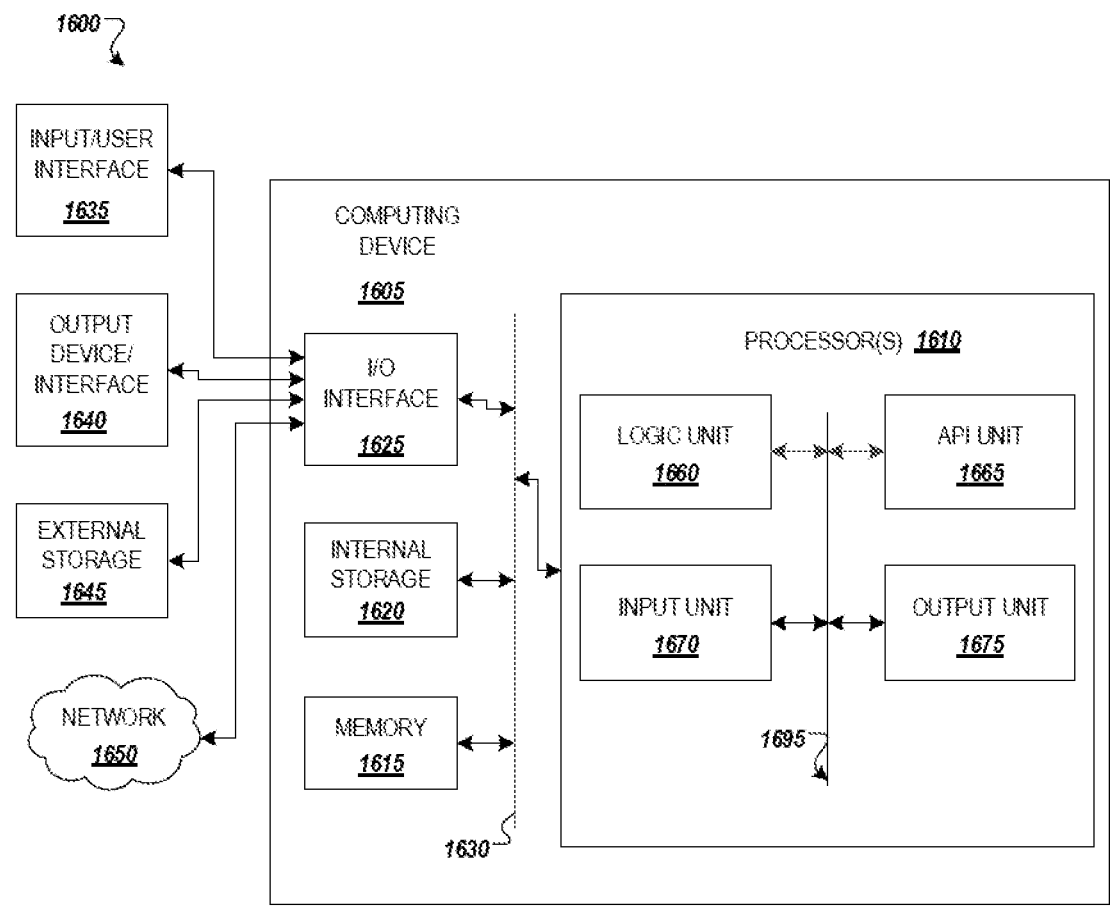
FIG. 16 illustrates an example computing environment with an example computing device suitable for use in some example implementations.

FIG. 16 illustrates an example computing environment with an example computing device suitable for use in some example implementations. Computing device 1605 in computing environment 1600 can include one or more processing units, cores, or processor(s) 1610, memory 1615 (e.g., RAM, ROM, and/or the like), internal storage 1620 (e.g., magnetic, optical, solid-state storage, and/or organic), and/or VO interface 1625, any of which can be coupled on a communication mechanism or bus 1630 for communicating information or embedded in computing device 1605. I/O interface 1625 is also configured to receive images from cameras or provide images to projectors or displays, depending on the desired implementation.

Computing device 1605 can be communicatively coupled to input/user interface 1635 and output device/interface 1640. Either one or both of the input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1640 may include a display, television, monitor, printer, speaker, braille, or the like. In some example implementations, input/user interface 1635 and output device/interface 1640 can be embedded with or physically coupled to computing device 1605. In other example implementations, other computing devices may function as or provide the functions of input/user interface 1635 and output device/interface 1640 for a computing device 1605.

Examples of computing device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1605 can be communicatively coupled (e.g., via I/O interface 1625) to external storage 1645 and network 1650 for communicating with any number of networked components, devices, and systems, including one or more computing devices of the same or different configuration. Computing device 1605 or any connected computing device can be functioning as, providing services of, or referred to as, a server, client, thin server, general machine, special-purpose machine, or another label.

I/O interface 1625 can include, but is not limited to, wired and/or wireless interfaces using any communication or LO protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computing device 1605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python. Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided. Processor(s) 1610 can be in the form of hardware processors such as central processing units (CPUs) or in a combination of hardware and software units.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, input unit 1670, and output unit 1675 in some example implementations described above. For example, the flow of one or more processes or implementations may be controlled by logic unit 1660 alone or in conjunction with API unit 1665. Input unit 1670 may be configured to obtain input for the calculations described in the example implementations, and output unit 1675 may be configured to provide an output based on the calculations described in example implementations.

Processor(s) 1610 can be configured to automatically identify a person as illustrated in FIGS. 4 and 9. The processor(s) 1610 may also be configured to identify a display device closest in proximity to the person as illustrated in FIGS. 4 and 9. The processor(s) 1610 may also be configured to generate context information specific to the person as illustrated in FIGS. 4 and 9. The processor(s) 1610 may also be configured to display the context information on the display device to be viewed by the person as illustrated in FIGS. 4 and 9.

The processor(s) 1610 may also be configured to, for the event being detected, analyze the event to detect existence of a predetermined event response for the event as illustrated in FIGS. 2 and 3. The processor(s) 1610 may also be configured to, for the predetermined event response being detected, notify the closest person having a clearance to address the event and providing an action solution to the closest person to address the event, wherein the person is identified as the closest person as illustrated in FIGS. 2 and 3.

The processor(s) 1610 may also be configured to create a new event response to address the event, the new event response comprises event information, an action to be taken, and clearance information, wherein the action comprises notifying the closest person having the clearance to address the event. Clearance information is a required clearance level for the closest person as illustrated in FIGS. 2 and 3. The processor(s) 1610 may also be configured to notify the closest person having the clearance to address the event and provide the action solution to the closest person to address the event as illustrated in FIGS. 2 and 3. The processor(s) 1610 may also be configured to retrieve a primary location of the person associated with assigned activity of the person from a pathway database as illustrated in FIG. 9.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible medium such as, but not limited to, optical disks, magnetic disks, read-only memories, random access memories, solid-state devices and drives, or any other types of tangible or non-transitory media suitable for storing electronic information. A computer readable signal medium may include medium such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or they may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generating and displaying context-based information, the method comprising:
    automatically identifying, by a processor, a person;
    identifying, by the processor, a display device closest in proximity to the person in comparison to a plurality of display devices;
    using an image capturing device to identify the display device among the plurality of display devices;
    generating, by the processor, context information specific to the person; and
    displaying the context information on the display device to be viewed by the person.

2. The method of claim 1,
    wherein automatically identifying the person is triggered by detection of an event; and
    wherein the person is identified as person to handle the event.

3. The method of claim 2, further comprising:
    for the event being detected, analyzing, by the processor, the event to detect existence of a predetermined event response for the event; and
    for the predetermined event response being detected, notifying, by the processor, a closest person having a clearance to address the event and providing an action solution to the closest person to address the event, wherein the person is identified as the closest person.

4. The method of claim 3, further comprising:
    for the predetermined event response not being detected:
        creating a new event response to address the event, the new event response comprises event information, an action to be taken, and clearance information, wherein the action comprises notifying the closest person having the clearance to address the event and the clearance information is a required clearance level of the closest person; and
        notifying, by the processor, the closest person having the clearance to address the event and providing the action solution to the closest person to address the event.

5. The method of claim 1,
    wherein automatically identifying the person comprises identifying an employee having authority to handle an event, and the person is identified as the employee;
    wherein generating the context information specific to the person comprises:
        calculating at least one of a visual aid or a text associated with the event,
        retrieving employee authority associated with the person,
        applying, based on the employee authority, a summarization technique from a plurality of summarization techniques on the at least one of the visual aid or the text to generate the context information, and
        determining a display technique from a plurality of display techniques for displaying the context information based on display type of the display device; and
    wherein the plurality of display techniques comprises graphic display of information based on display size and information display control based on the display size.

6. The method of claim 1,
    wherein automatically identifying the person comprises performing, by the processor, human recognition to detect the person from a plurality of persons using computer visions algorithms;
and
wherein performing the human recognition is triggered by occurrence of an event, and the person has clearance to handle the event.

7. The method of claim 1,
wherein automatically identifying the person comprises performing, by the processor, radio-frequency identification (RFID) detection on RFID tags carried by a plurality of persons to identify the person from the plurality of persons.

8. The method of claim 7,
wherein identifying the display device closest in proximity to the person comprises perfonni.ng, by the processor, at least one of object recognition or RFID detection to identify the display device from a plurality of display devices, and the display device is closest in proximity to the person in comparison to the plurality of display devices.

9. The method of claim 1, further comprising:
retrieving, by the processor, a primary location of the person associated with assigned activity of the person from a pathway database; and
wherein the display device is a display device that is closest in distance to the primary location.

10. The method of claim 9,
wherein automatically identifying the person comprises performing, by the processor, radio-frequency identification (RFID) detection on an RFID tag possessed by the person to identify on site presence of the person.

11. A system for genera ting and displaying context-based information, the system comprising:
a plurality of display devices;
a processor; wherein the processor is configured to:
automatically identify a person;
identify a display device from the plurality of display devices closest in proximity to the person in comparison to a plurality of display devices;
generate context information specific to the person; and
use an image capturing device to identify the display device among the plurality of display devices;
display the context information on the display device to be viewed by the person.

12. The system of claim 11,
wherein automatically identify the person is triggered by detection of an event; and
wherein the person is identified as person to handle the event.

13. The system of claim 12, wherein the processor is further configured to:
for the event being detected, analyze the event to detect existence of a predetermined event response for the event; and
for the predetermined event response being detected, notify a closest person having a clearance to address the event and providing an action solution to the closest person to address the event, wherein the person is identified as the closest person.

14. The system of claim 13, wherein the processor is further configured to:
for the predetermined event response not being detected:
create a new event response to address the event, the new event response comprises event information, an action to be taken, and clearance information,
wherein the action comprises notifying the closest person having the clearance to address the event and the clearance information is a required clearance level of the closest person; and
notify the closest person having the clearance to address the event and providing the action solution to the closest person to address the event.

15. The system of claim 11,
wherein the processor is configured to automatically identify the person by identifying an employee having authority to handle an event, and the person is identified as the employee;
wherein the processor is configured to generate the context information specific to the person by:
receiving at least one of a visual aid or a text associated with the event,
calculating employee authority associated with the person,
applying, based on the employee authority, a summarization technique from a plurality of summarization techniques on the at least one of the visual aid or the text to generate the context information, and
determining a display technique from a plurality of display techniques for displaying the context information based on display type of the display device; and
wherein the plurality of display techniques comprises graphic display of information based on display size and information display control based on the display size.

16. The system of claim 11,
wherein the processor is configured to automatically identify the person by performing human recognition to detect the person from a plurality of persons using computer visions algorithms;
and
wherein perform the human recognition is triggered by occurrence of an event, and the person has clearance to handle the event.

17. The system of claim 11,
wherein the processor is configured to automatically identify the person by performing radio-frequency identification (RFID) detection on RFID tags carried by a plurality of persons to identify the person from the plurality of persons.

18. The system of claim 17,
wherein the processor is configured to identify the display device closest in proximity to the person by performing at least one of object recognition or RFID detection to identify the display device from the plurality of display devices.

19. The system of claim 11, the processor is further configured to:
retrieve a primary location of the person associated with assigned activity of the person from a pathway database; and
wherein the display device is a display device that is closest in distance to the primary location.

20. The system of claim 19,
wherein the processor is configured to automatically identify the person comprises performing radio-frequency identification (RFID) detection on an RFID tag possessed by the person to identify on site presence of the person.

* * * * *